(12) United States Patent
Sogawa

(10) Patent No.: US 6,504,334 B2
(45) Date of Patent: Jan. 7, 2003

(54) CIRCUITRY AND METHOD FOR DRIVING A MOTOR

(75) Inventor: Hisamo Sogawa, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/834,664

(22) Filed: Apr. 13, 2001

(65) Prior Publication Data

US 2001/0030525 A1 Oct. 18, 2001

(30) Foreign Application Priority Data

Apr. 18, 2000 (JP) .......................................... 2000-116289

(51) Int. Cl.[7] .............................................. G05B 11/28
(52) U.S. Cl. ........................ 318/599; 318/811; 318/439
(58) Field of Search ................................ 318/599, 811, 318/439, 254, 432, 812

(56) References Cited

U.S. PATENT DOCUMENTS 6,353,354 B1 * 3/2002 Detweiler et al. .......... 318/811
6,380,709 B2 * 4/2002 Nishimura et al. ......... 318/811

* cited by examiner

*Primary Examiner*—Karen Masih
(74) *Attorney, Agent, or Firm*—Michael Best & Friedrich; Laff Whitesel & Saret; J. Warren Whitesel

(57) ABSTRACT

In circuitry for driving a motor 9 by PWM (Pulse Width Modulation) control. a pulse sequence Spwm is generated on the basis of a triangular wave TR that is control led by a capacitor. The pulses of the pulse sequence Spwm are counted in synchronism with position signals U1, V1 and W1 output from position sensing means, which is responsive to the angular positions of the motor 9, so that a duty modulation signal Sduty-b is generated for reducing noise ascribable to the rotation of the motor 9. An exciting pulse generating circuit 8 switches a MOSFET (Metal Oxide Semiconductor Field Effect Transistor) circuit 11 with gate signals Q1P through Q3P and Q1N through Q3N.

116 Claims, 8 Drawing Sheets

CIRCUITRY AND METHOD FOR DRIVING A MOTOR

BACKGROUND OF THE INVENTION

The present invention relates to a motor and more particularly to circuitry for driving a motor by PWM (Pulse Width Modulation) control while reducing noise ascribable to the rotation of the motor with a simple configuration, and a motor driving method therefor.

For the drive of a brushless motor, there is an increasing demand for PWM control that implements efficient rotation. There is also required a method capable of driving the motor while reducing noise ascribable to the rotation of the motor. However, conventional PWM type of motor drive circuitry lacking a measure against noise has the following problems (1) through (3) left unsolved.

(1) At the time of phase switching, MOSFETs (Metal Oxide Semiconductor Field Effect Transistors) are sharply turned on by hard switching, causing current to sharply change. The resulting pulses generate noise inductively coupled to the floating coil or a plurality of coils of a motor.

(2) The level of noise ascribable to rotation differs from one motor to another motor, so that a noise reduction time must be finely control led motor by motor. Such fine control, however, is not easy to execute because the noise reduction time cannot be controlled by a capacitor or similar part that is easy to replace.

(3) The circuitry is scaled up because it is sophisticated and uses many amplifiers whose size is likely to increase.

Technologies relating to the present invention are disclosed in, e.g., Japanese Patent Laid-Open Publication Nos. 8-126381 and 11-235079 and Japanese Patent Nos. 2,721,081 and 3,015,588.

SUMMARY OF THE INVENTION

It is therefore an object of the present invention to solve the problems (1) through (3) stated above.

It is another object of the present invention to maintain, when driving a brushless motor by PWM control, a noise reduction time constant without regard to the rotation speed of the motor for thereby preventing efficiency from noticeably falling at high rotation speeds, while saving energy.

Circuitry for driving a motor by PWM control of the present invention includes switching devices respectively associated with drive coils, which are included in the motor and assigned to a particular phase each. A frequency oscillator generates a triangular wave. A first comparator generates a pulse sequence by comparing the triangular wave and a voltage for PWM oscillation frequency modulation. A position sensing circuit senses the angular positions of the motor. A pulse generating circuit counts a preselected number of pulses, which are included in the pulse sequence, by using each of the positive-going and negative-going edges of position signals output from the position sensing circuit as a trigger to thereby generate pulse signals. A voltage adjusting circuit converts a voltage for duty modulation to a plurality of voltage levels. A voltage selector selects one of the voltage levels in accordance with the pulse signals output from the pulse generating circuit, and outputs the voltage level selected as a duty modulation voltage. A second comparator outputs a first duty signal by comparing the voltage for duty modulation and the triangular wave. A third comparator outputs a second duty signal by comparing the duty modulation voltage output from the voltage adjusting means and the triangular wave. An exciting pulse generating circuit generates, based on the position signals output from the position sensing circuit and the first and second duty signals, a gate signal for switching control for a preselected period of time at each time of phase switching. The gate signal includes a signal for reducing the noise of the motor.

A motor driving method for the above circuitry is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention. brief reference will be made to conventional circuitry for driving a brushless motor with the PWM control scheme, shown in FIG. 1. The conventional circuitry to be described does not include a measure against noise ascribable to the rotation of the motor.

Figure 1:
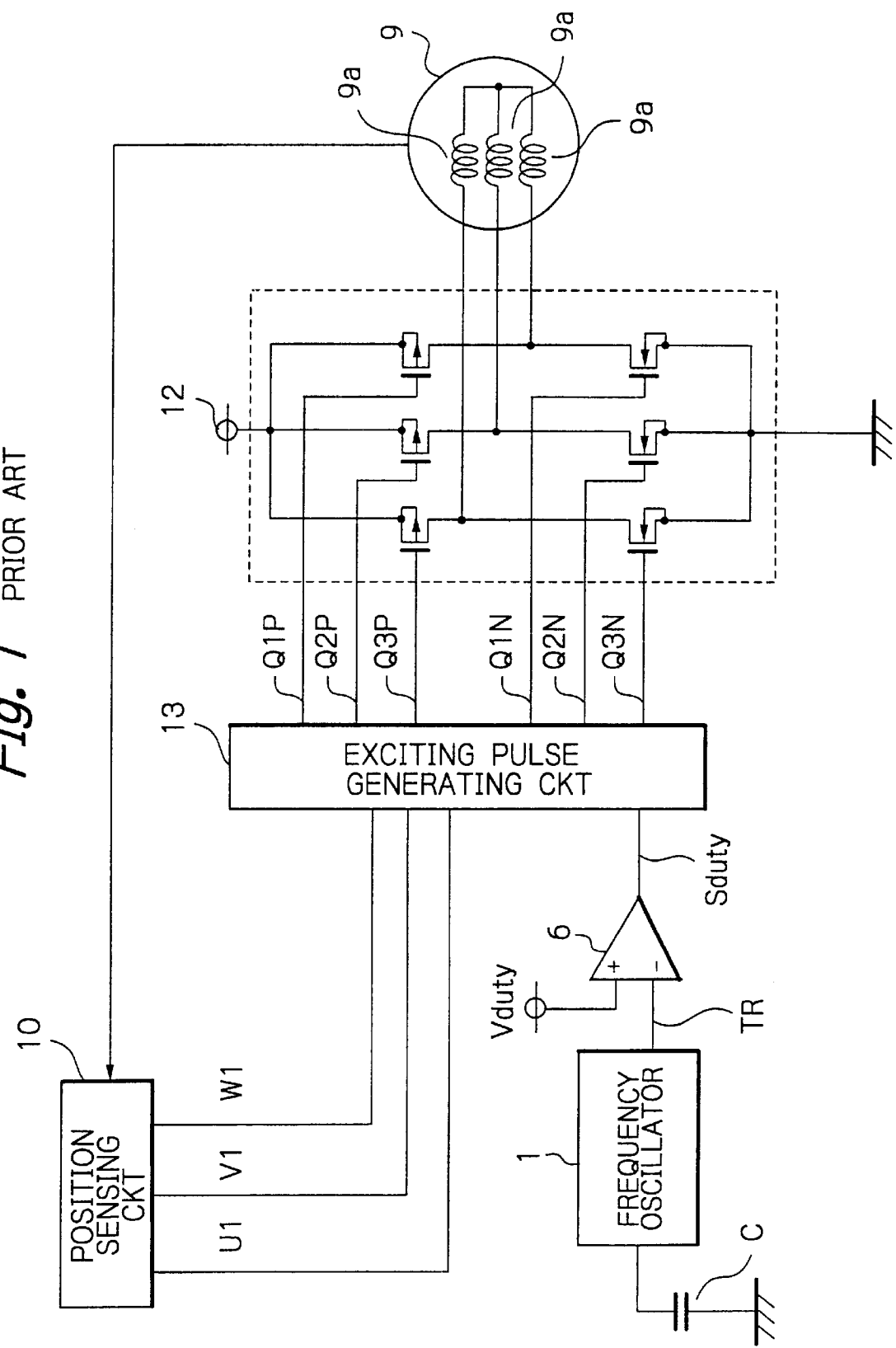
FIG. 1 is a schematic block diagram showing conventional motor driving circuitry.
Figure 2:
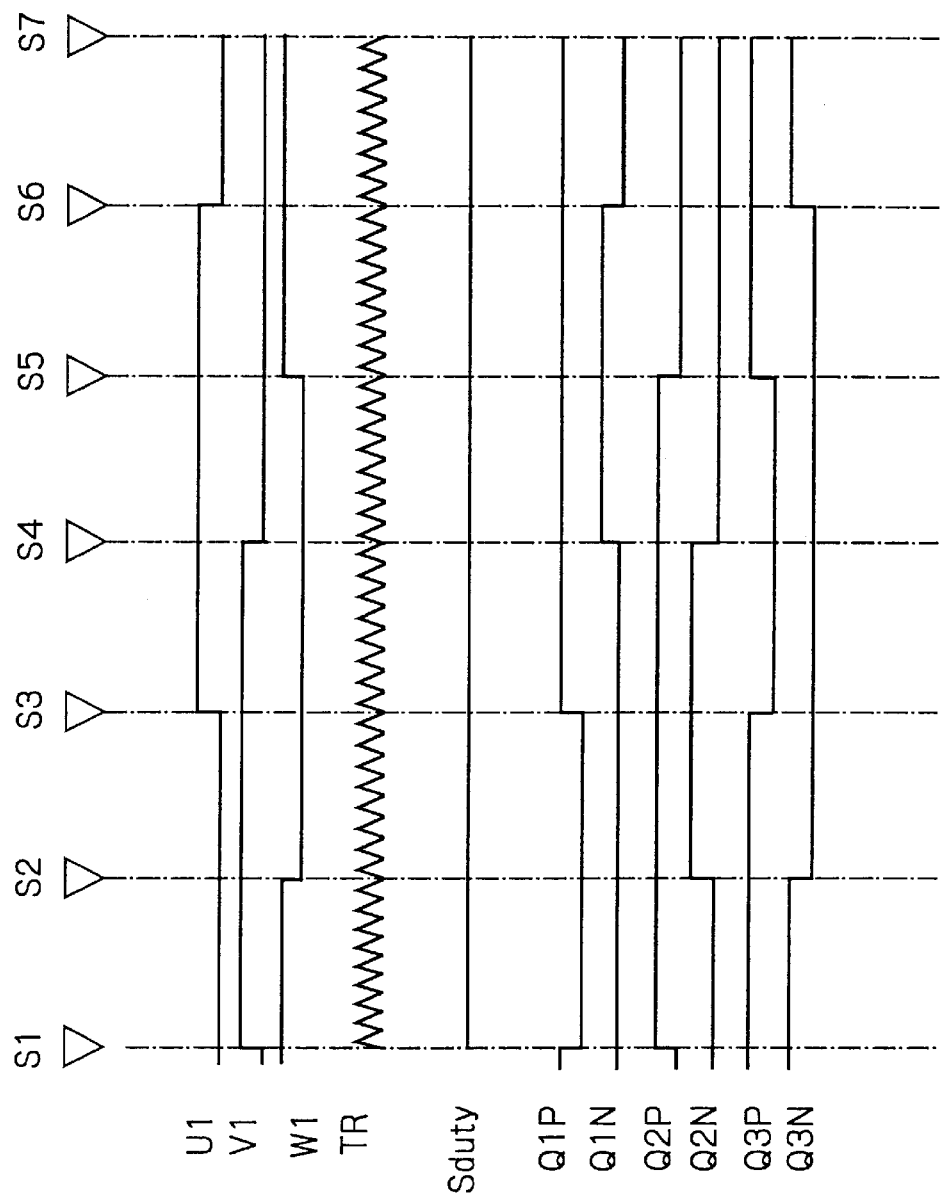
FIGS. 2 and 3 are timing charts demonstrating the operation of the circuitry shown in FIG. 1.
Figure 3:
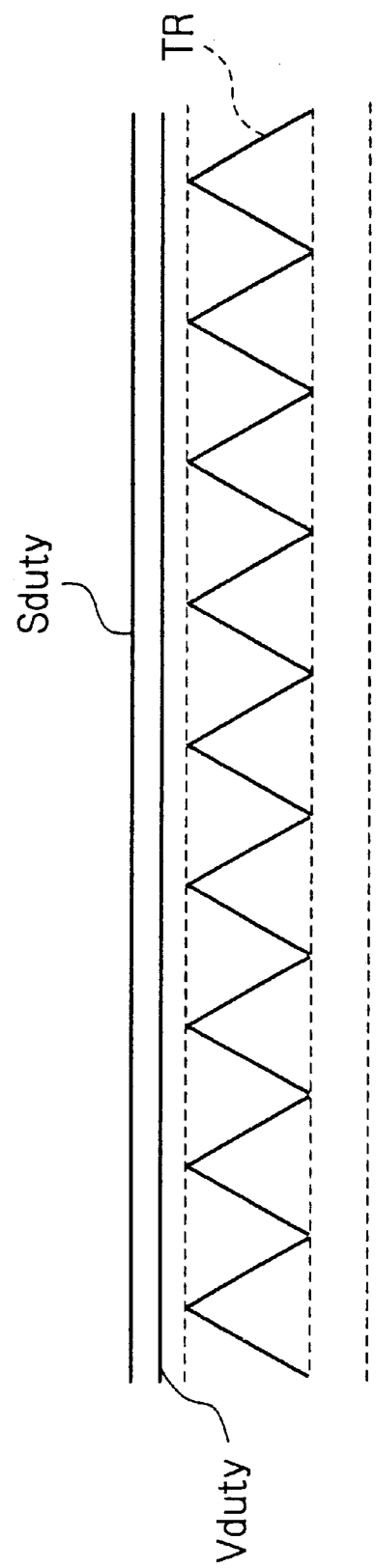

As shown in FIG. 1. the circuitry includes a frequency oscillator 1 for generating a triangular wave TR (see FIGS. 2 and 3). The triangular wave TR and a voltage Vduty for duty modulation are input to a comparator 6. The comparator 6 outputs a duty modulation signal Sduty by comparing the triangular wave TR and voltage Vduty. A position sensing circuit 10 senses the angular positions of a brushless motor 9. which includes drive coils 9a. and outputs signals U1, V1 and W1. An exciting pulse generating circuit 13 determines a duty in accordance with the signals U1, V1 and W1 and the signal Sduty and generates gate signals Q1P, Q2P, Q3P, Q1N, Q2N and Q3N. A MOSFET (Metal Oxide Semiconductor Field Effect Transistor) circuit 11 includes MOSFETs each of which is driven by particular one of the gate signals Q1P through Q3N, The reference numeral 12 designates a VM terminal to which a power source voltage is applied.

As shown in FIG. 3. assume that the voltage Vduty. which determines a duty, is higher than the maximum amplitude level of the triangular signal TR. FIG. 2 shows a specific operation of the circuitry to be performed in such a condition. As shown, the gate signals Q1P through Q3N sharply go high at switching points S1 through S7. As a result, the MOSFETs of the MOSFET circuit 11 each perform hard switching every time it receives particular one of the gate signals Q1P through Q3N, producing noise. This is also true when the voltage Vduty has any other value.

More specifically, as shown in FIG. 2. the MOSFETs of the MOSFET circuit 11 perform hard switching at every one of the switching points S1 through S7 at which the rotation phase of the motor 9 is switched. This causes a current to sharply vary at every one of the switching points S1 through S7 and thereby generates noise inductively coupled to the floating coil or a plurality of coils of the motor 9

Figure 4:
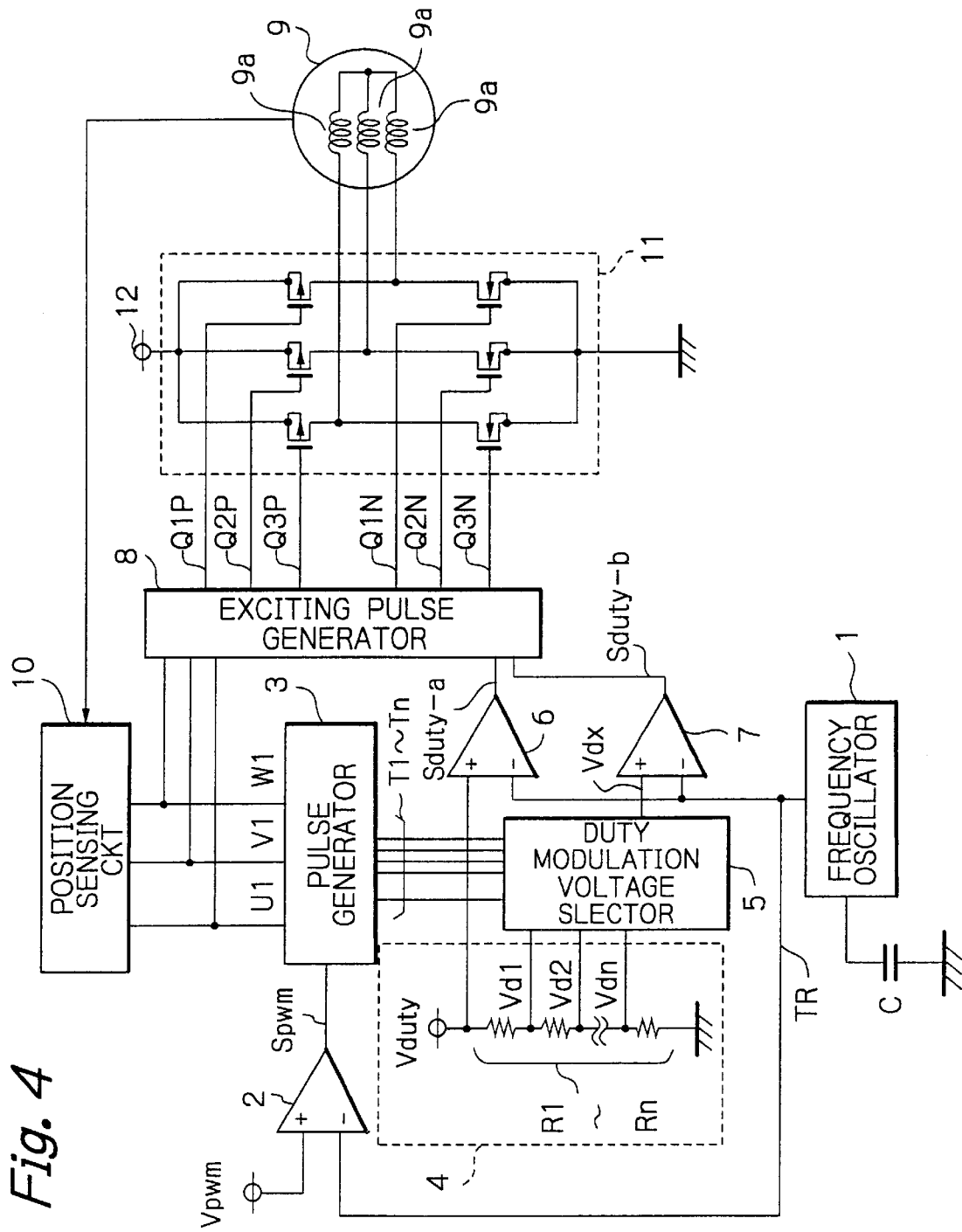
FIG. 4 is a schematic block diagram showing motor driving circuitry embodying the present invention.

Referring to FIG. 4 of the drawings, motor driving circuitry embodying the present invention is shown. In FIG.

4, structural elements identical with the structural elements of FIGS. 1 through 3 are designated by identical reference numerals and will not be described specifically in order to avoid redundancy. As shown, the circuitry includes a frequency oscillator 1 whose frequency is controlled by a capacitor C. The frequency oscillator 1 generates a triangular wave TR. A comparator 2 compares the triangular wave TR and a voltage Vpwm for PWM oscillation frequency modulation to thereby output a pulse sequence Spwm.

A position sensing circuit 10 outputs position signals U1, V1 and W1 representative of the angular positions of a motor 9. A pulse generator 3 starts counting the pulses Spwm by using each of the positive-going edges and negative-going edges of the signals U1, V1 and W1 as a trigger. On counting a preselected number of pulses Spwm. the pulse generator 3 outputs pulse signals T1 through Tn (T1 through T5 in FIG. 5).

A duty modulation voltage adjusting circuit 4 converts the level of a voltage Vduty for duty modulation with resistors R1 through Rn to voltages Vd1 through Vdn. A duty modulation voltage selector 5 selects one Vdx of the voltages Vd1 through Vdn under the control of the pulse signals S1 through Tn. A comparator 6 compares the above voltage Vduty and triangular wave TR and outputs a first duty signal Sduty-a representative of a difference therebetween. Likewise, a comparator 7 compares the voltage Vdx selected and triangular wave TR to thereby output a second duty signal Sduty-b representative of a difference therebetween.

The first duty signal Sduty-a and second duty signal Sduty-b are input to an exciting pulse generating circuit 8 together with the position signals U1, V1 and W1 representative of the angular positions of the motor 9. The exciting pulse generating circuit 8 generates, based on such input signals, one of gate signals Q1P through Q3P and Q1N through Q3N over a preselected period of time every time the phase is switched. The gate signals Q1P through Q3P and Q1N through Q3N switch a MOSFET circuit 11, and each includes a signal for reducing noise ascribable to the rotation of the motor 9.

The MOSFET circuit 11 includes a plurality of MOSFETs. The gate signals Q1P through Q3P and Q1N through Q3N each are applied to the gate of a particular MOSFET for turning it on and turning it off. A power source voltage is applied to drive coils 9a, which are included in the motor 9, via a VM terminal 12.

Figure 5:
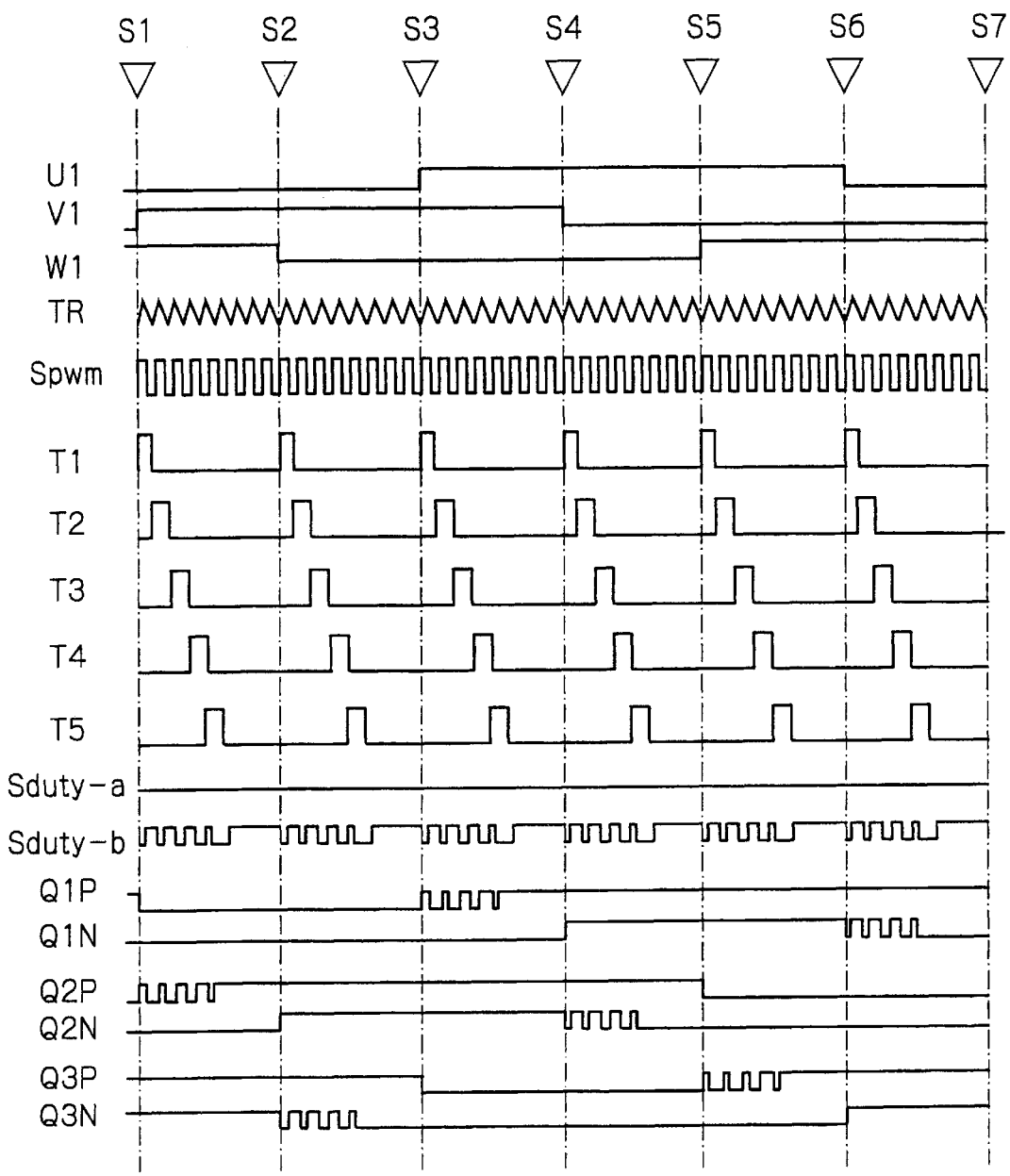
FIGS. 5 through 8 are timing charts showing the operation of the illustrative embodiment.

In operation, the position sensing circuit 10 senses the angular positions of the drive coils 9a assigned to a U phase, a V phase and a W phase, respectively. The position sensing circuit 10 feeds the position signals U1, V1 and W1 representative of the above positions to the pulse generator 3. In the case of 120° drive by way of example, the position signals U1, V1 and W1 appear as shown in FIG. 5 specifically.

The frequency oscillator 1 generates, based on the charging and discharging of the capacitor C, the triangular wave TR having a period shorter than the interval between the consecutive points at which the phase of the motor 9 is switched. For example, as shown in FIG. 5, the triangular wave has a period shorter than the interval between the phase switching points S1 and S2. The triangular wave TR is input to the comparators 2, 6 and 7.

Figure 6:
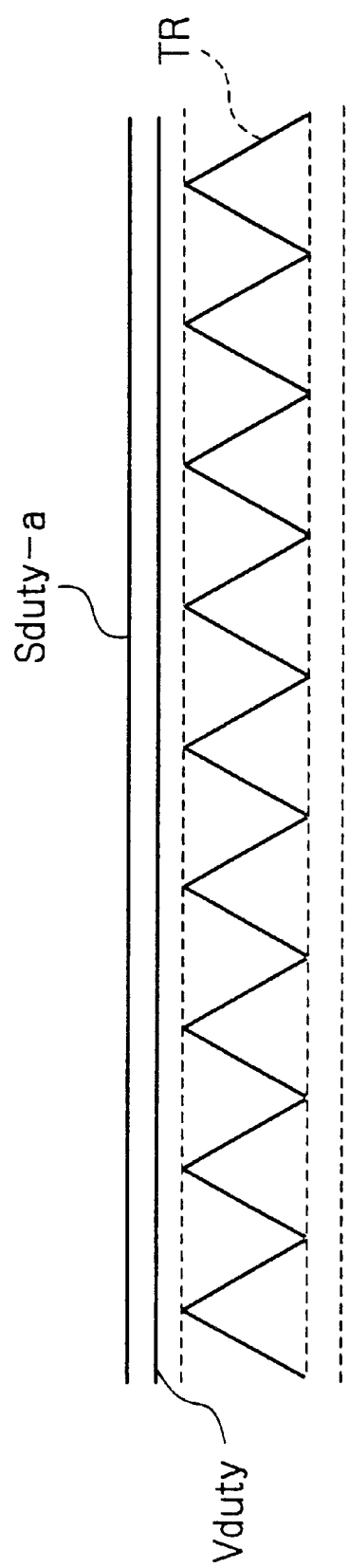
Figure 7:
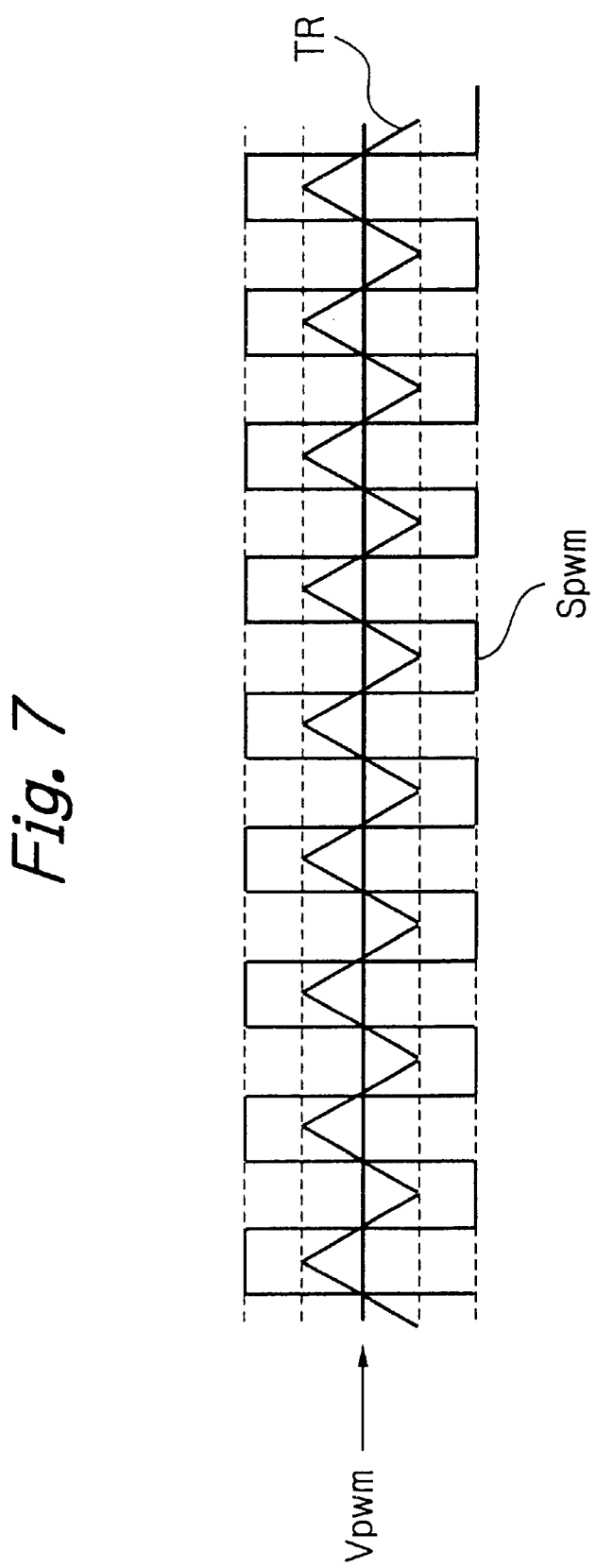

As shown in FIG. 6, the triangular wave TR has the maximum amplitude level and the minimum amplitude level. In the illustrative embodiment the voltage Vpwm for PWM oscillation frequency modulation has a level between the above maximum and minimum levels. The comparator 2 compares the voltage Vpwm and triangular wave TR and feeds a pulse sequence Spwm, which the pulse generator 3 is a expected to count, to the pulse generator 3.

The pulse generator 3 starts counting the pulses Spwm by using each of the positive-going edges and negative-going edges of the signals U1, V1 and W1 as a trigger. On counting a preselected number of pulses Spwm, the pulse generator 3 outputs the pulse signals T1 through Tn (n being 5 in FIG. 5). For example, every time the pulse generator 3 counts five consecutive pulses Spwm, it outputs the pulse signals T1 through T5. The pulse signals T1 through T5 are input to the duty modulation voltage selector 5.

Figure 8:
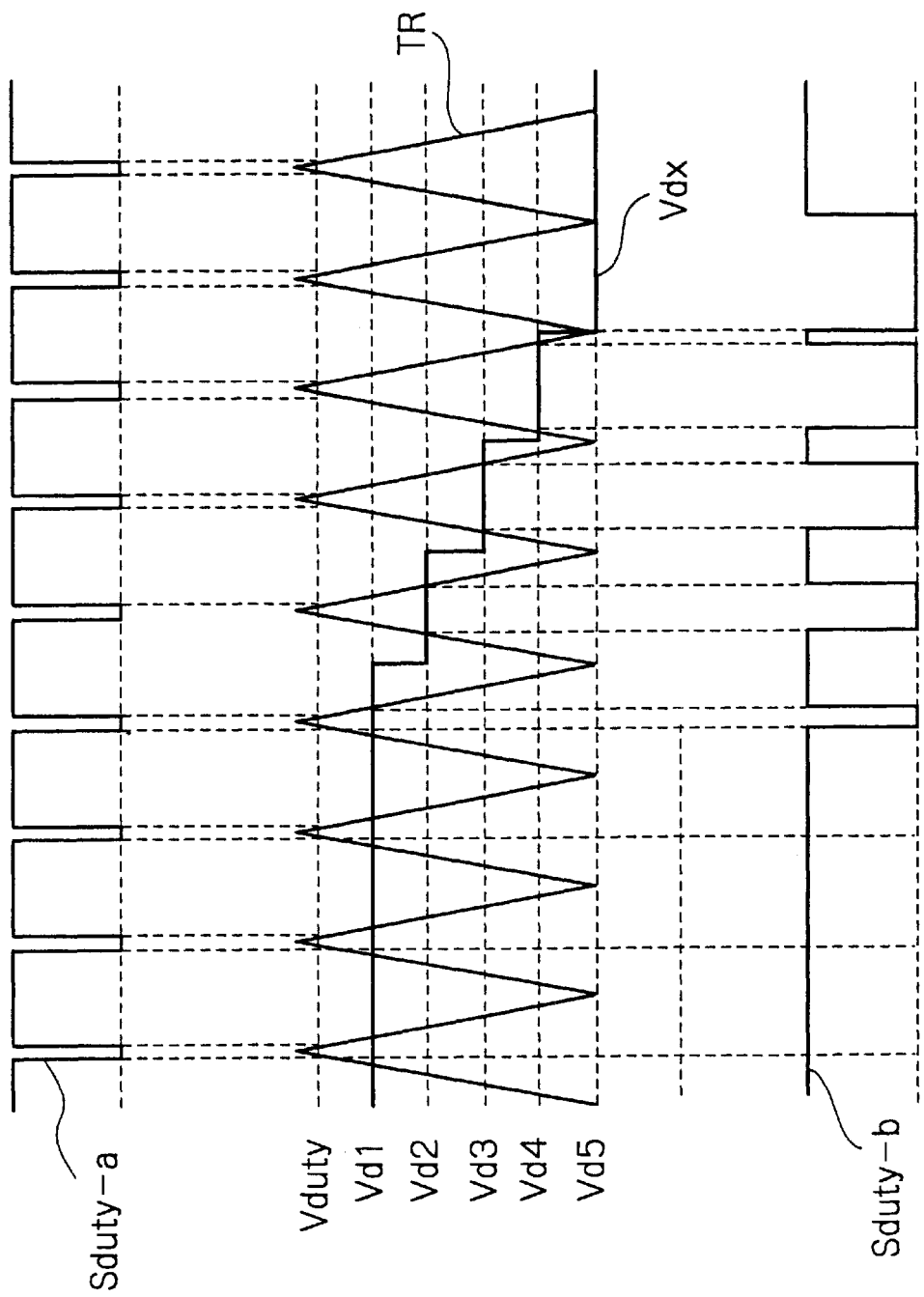

The duty modulation voltage adjusting circuit 4 converts the level of the voltage Vduty for duty modulation to the voltages Vd1 through Vdn with the resistors RI through Rn. Assume that the circuit 4 includes five resistors R1 through R5. Then, as shown in FIG. 8, the circuit 4 outputs five voltages Vd1 through Vd5. The voltage Vduty is input to one input terminal of the comparator 6 also, which generates the first duty modulation signal Sduty-a. The voltages Vd1 through Vd5 output from the circuit 4 are input to the duty modulation signal selector 5.

The duty modulation signal selector 5 selects one Vdx of the input voltages Vd1 through Vdn in accordance with the input pulse signals T1 through Tn. The voltage Vdx selected is fed to the comparator 6, which generates the second duty modulation signal Sduty-b. Specifically, as shown in FIGS. 5 and 8, the selector 5 selects the voltage Vd1 in response to the pulse signal T1 and outputs it as the voltage Vdx. Likewise, the selector 5 selects the voltage Vd2 in response to the pulse signal T2 and outputs it as the voltage Vdx. Further, the selector 5 selects the voltages Vd3, Vd4 and Vd5 in response to the pulse signals T3, T4 and T5, respectively.

The comparator 6 compares the voltage Vduty for duty modulation with the triangular wave TR to thereby output the first duty modulation signal Sduty-a. For example, as FIG. 8 indicates, when the voltage Vduty lies between he maximum and minimum amplitudes of the triangular wave TR. the first duty modulation signal Sduty-a is the result of comparison thereof with the triangular wave TR.

The comparator 7 compares the voltage Vdx for duty modulation with the triangular wave TR to thereby output the second duty modulation signal Sduty-b. For example, assume that the duty modulation signal selector 5 selects one of five stepwise voltages Vd1 through Vd5, as stated earlier. Then, as shown in FIG. 8, the voltage Vdx output from the duty modulation signal selector 5 is shifted in level in five consecutive steps in every period of the triangular wave TR.

The exciting pulse generator 8 generates the gate signals Q1P through Q3P and Q1N through Q3N meant for the MOSFET circuit 11 in accordance with the position signal U1, V1 and W1 and first and second duty modulation signals Sduty-a and Sduty-b. For example, as shown in FIG. 5, the exciting pulse generator 8 generates the gate signals Q1P through Q3P and Q1N through Q3N in accordance with the second duty modulation signal Sduty-b when p-channel MOSFETs and n-channel MOSFETs, respectively, should be turned off.

The timing chart shown in FIG. 5 assumes the specific case wherein the voltage Vduty is higher than the maximum amplitude level of the triangular wave TR, as shown in FIG. 6. In FIG. 5, a single period is assumed to extend from a switching point S1 to a switching point S7; the switching points S1 and S7 are representative of the same timing. The switching point S2 therefore follows the switching point S7. The switching procedure will be described hereinafter.

The gate signals Q1P through Q3P and Q1N through Q3N effect duty modulation in synchronism with the first duty modulation signal Sduty-a and second duty modulation signal Sduty-b. The gate signals Q1P through Q3P and Q1N through Q3N each are generated for a preselected period of time in synchronism with the positive-going edge or the negative-going edge of particular one of the position signals U1, V1 and W1.

More specifically, as shown in FIG. 5 that also assumes the specific case shown in FIG. 6, the gate signal Q1P effects duty modulation in synchronism with the first duty modulation signal Sduty-a from the switching point S1 to the switching point S3. From the switching point S3 to the switching point S4, the gate signal Q1P effects duty modulation in synchronism with the second duty modulation signal Sduty-b by using the positive-going edge of the position signal U1 as a trigger. The gate signal Q1P is then turned off in synchronism with the pulse signal T5 and remains turned off over the interval between the switching points S4 and S7.

The gate signal Q2P effects duty modulation in synchronism with the first duty modulation signal Sduty-a from the switching point S5 to the switching point S7. From the switching point S1 to the switching point S2, the gate signal Q2P effects duty modulation in synchronism with the second duty modulation signal Sduty-b by using the positive-going edge of the position signal V1 as a trigger. The gate signal Q2P is then turned off in synchronism with the pulse signal T5 and remains turned off over the interval between the switching points S2 and S5.

The gate signal Q3P effects duty modulation in synchronism with the first duty modulation signal Sduty-a from the switching point S3 to the switching point S5. From the switching point S5 to the switching point S6, the gate signal Q3P effects duty modulation in synchronism with the second duty modulation signal Sduty-b by using the positive-going edge of the position signal W1 as a trigger. The gate signal Q3P is then turned off in synchronism with the pulse signal T5 and remains turned off over the interval between the switching points S6 and S3.

The gate signal Q1N effects duty modulation in synchronism with the first duty modulation signal Sduty-a from the switching point S4 to the switching point S6. From the switching point S6 to the switching point S7, the gate signal Q1N effects duty modulation in synchronism with the second duty modulation signal Sduty-b by using the negative-going edge of the position signal U1 as a trigger. The gate signal Q1N is then turned off in synchronism with the pulse signal T5 and remains turned off over the interval between the switching points S7 and S4.

Likewise, the gate signal Q2N effects duty modulation in synchronism with the first duty modulation signal Sduty-a from the switching point S2 to the switching point S4. From the switching point S4 to the switching point S5, the gate signal Q2N effects duty modulation in synchronism with the second duty modulation signal Sduty-b by using the negative-going edge of the position signal VU1 as a trigger. The gate signal Q2N is then turned off in synchronism with the pulse signal T5 and remains turned off over the interval between the switching points S5 and S2.

Further, the gate signal Q3N effects duty modulation in synchronism with the second duty modulation signal Sduty-b from the switching point S2 to the switching point S3 by using the negative-going edge of the position signal W1 as a trigger. The gate signal Q3N is then turned off in synchronism with the pulse signal T5 and remains turned off over the interval between the switching points S3 and S6. Subsequently, from the switching point S6 to the switching point S2, the gate signal Q3N effects duty modulation in synchronism with the first duty modulation signal Sduty-a.

The illustrative embodiment shown and described may be modified in various ways, as follows.

While the illustrative embodiment has concentrated on a three-phase motor, it is, of course, applicable even to a single-phase motor or a motor having four or more phases.

The angle over which current is fed is not limited to 120°, but may be any other suitable angle.

The MOSFETs used as switching devices may be replaced with any other switching devices, e.g., bipolar transistors.

In the illustrative embodiment, the pulse generator 3 counts five pulses Spwm to thereby output five pulse signals T1 through T5. However, the crux is that the pulse generator 3 counts any desired number of Pulses above 1 inclusive and outputs corresponding number of pulse signals T1 through Tn.

In the duty modulation voltage adjusting circuit 4, the resistors R1 through R5 are used to convert the voltage Vduty, which determines the rotation speed of the motor 9, for thereby outputting the modulation signal Sduty and voltages Vd1 through Vd5. However, any other suitable number of resistors may be uses to output a corresponding number of voltages V1 through Vn.

The illustrative embodiment reduces noise by effecting duty modulation in synchronism with the modulation signal Sduty-b when the p-channel and n-channel MOSFETs should be turned off. Alternatively, duty modulation may be effected in synchronism with the modulation signal Sduty-b even when the MOSFETs should be turned on in order to reduce noise.

While the pulse signals T1 through T5 and voltages Vd1 through Vd5 correspond one-to-one to each other, they may be provided with any other suitable relation. For example, an arrangement may be made such that the pulse signals T1 through T5 correspond to the voltage Vd1, pulse Signals T6 through T10 correspond to the voltage Vd2, and so forth.

In summary, it will be seen that the present invention provides motor driving circuitry and a motor driving method achieving various unprecedented advantages, as enumerated below.

(1) MOSFETs or similar switching devices are not sharply turned on or turned off at the time of phase switching, but are turned on and turned off with a duty being varied little by little. This successfully obviates, at the time of phase switching, pulses ascribable to sharp changes in current and causative of noise, thereby reducing noise particular to PWM motor control.

(2) Pulses are generated on the basis of a triangular wave that is controlled by a capacitor. The pulses are counted in synchronism with the switching of a phase in order to determine a duty modulation time, which is directed toward noise reduction. Therefore, when a motor is replaced, i.e., when the time constant of a motor changes, the duty modulation time can be easily varied only if the capacitor is replaced.

(3) The pulses derived from the triangular wave are counted to determine the duty modulation time, as stated above The intervals between consecutive switching points, on which the duty modulation time is based, differ from the high-speed rotation to the low-speed rotation of the motor. Therefore, if the duty modulation time is so adjusted as to reduce noise during high-speed rotation. then noise can be further reduced during low-speed rotation.

(4) A triangular wave oscillator essential with PWM drive is used to reduced noise. It follows that PWM motor driving circuit can be implemented without resorting to any extra parts.

Various modifications will become possible for those skilled in the art after receiving the teachings of the present disclosure without departing from the scope thereof.

What is claimed is:

1. Circuitry for driving a motor by PWM (Pulse Width Modulation) control, comprising:

switching means respectively associated with drive coils, which are included in the motor and assigned to a particular phase each;

frequency oscillating means for generating a triangular wave;

first comparing means for generating a pulse sequence by comparing the triangular wave and a voltage for PWM oscillation frequency modulation:

position sensing means for sensing angular positions of the motor;

pulse generating means for counting a preselected number of pulses, which are included in the pulse sequence, by using each of positive-going edges and negative-going edges of position signals output from said position sensing means as a trigger to thereby generate pulse signals;

voltage adjusting means for converting a voltage for duty modulation to a plurality of voltage levels;

voltage selecting means for selecting one of the plurality of voltage levels in accordance with the pulse signals output from said pulse generating means, and outputting a voltage level selected as a duty modulation voltage;

second comparing means for outputting a first duty signal by comparing the voltage for duty modulation and the triangular wave;

third comparing means for outputting a second duty signal by comparing the duty modulation voltage output from said voltage adjusting means and the triangular wave; and exciting pulse generating means for generating, based on the position signals output from said position sensing means and the first and second duty signals, a gate signal for switching control for a preselected period of time at each time of phase switching, wherein said gate signal includes a signal for reducing noise of the motor.

2. The circuitry as claimed in claim 1, wherein said voltage adjusting means divides the voltage for duty modulation with a plurality of resistors to thereby output the voltage levels, and said voltage selecting means selects one of the voltage levels in accordance with the pulse signals.

3. The circuitry as claimed in claim 2, wherein said frequency oscillating means generates the triangular wave on the basis of charging and discharging of a capacitor.

4. The circuitry as claimed in claim 3, wherein the capacitor has a variable capacitance.

5. The circuitry as claimed in claim 4, wherein the capacitor is replaceable.

6. The circuitry as claimed in claim 5, wherein the preselected number of pulses to be counted by said pulse generating means is variable.

7. The circuitry as claimed in claim 6, wherein the capacitor is replaced or the preselected number of pulses is varied when the motor is replaced.

8. The circuitry as claimed in claim 7, wherein said switching means comprises a plurality of MOSFETs (Metal Oxide Semiconductor Field Effect Transistors).

9. The circuitry as claimed in claim 8, wherein said switching means comprises bipolar transistors.

10. The circuitry as claimed in claim 9, wherein said exciting pulse generating means generates the gate signal when said switching means should be turned off.

11. The circuitry as claimed in claim 10, wherein said exciting pulse generating means generates the gate signal when said switching means should be turned on.

12. The circuitry as claimed in claim 11, wherein said exciting pulse generating means generates the gate signal when said switching means should be turned off and when said switching means should be turned on.

13. The circuitry as claimed in claim 12, wherein the plurality of voltage levels to be selected by said voltage selecting means and the pulse signals to be output from said pulse generating means correspond one-to-one to each other.

14. The circuitry as claimed in claim 13, wherein the plurality of voltage levels to be selected by said voltage selecting means and the pulse signals to be output from said pulse generating means have a 1:n correspondence to each other.

15. The circuitry as claimed in claim 1, wherein said frequency oscillating means generates the triangular wave on the basis of charging and discharging of a capacitor.

16. The circuitry as claimed in claim 15, wherein the capacitor has a variable capacitance.

17. The circuitry as claimed in claim 16, wherein the capacitor is replaceable.

18. The circuitry as claimed in claim 17, wherein the preselected number of pulses to be counted by said pulse generating means is variable.

19. The circuitry as claimed in claim 18, wherein the capacitor is replaced or the preselected number of pulses is varied when the motor is replaced.

20. The circuitry as claimed in claim 19, wherein said switching means comprises a plurality of MOSFETs.

21. The circuitry as claimed in claim 20, wherein said switching means comprises bipolar transistors.

22. The circuitry as claimed in claim 21, wherein said exciting pulse generating means generates the gate signal when said switching means should be turned off.

23. The circuitry as claimed in claim 22, wherein said exciting pulse generating means generates the gate signal when said switching means should be turned on.

24. The circuitry as claimed in claim 23, wherein said exciting pulse generating means generates the gate signal when said switching means should be turned off and when said switching means should be turned on.

25. The circuitry as claimed in claim 24, wherein the plurality of voltage levels to be selected by said voltage selecting means and the pulse signals to be output from said pulse generating means correspond one-to-one to each other.

26. The circuitry as claimed in claim 25, wherein the plurality of voltage levels to be selected by said voltage selecting means and the pulse signals to be output from said pulse generating means have a 1:n correspondence to each other.

27. The circuitry as claimed in claim 1, wherein the capacitor has a variable capacitance.

28. The circuitry as claimed in claim 27, wherein the capacitor is replaceable.

29. The circuitry as claimed in claim 28, wherein the preselected number of pulses to be counted by said pulse generating means is variable.

30. The circuitry as claimed in claim 29, wherein the capacitor is replaced or the preselected number of pulses is varied when the motor is replaced.

31. The circuitry as claimed in claim 30, wherein said switching means comprises a plurality of MOSFETs.

32. The circuitry as claimed in claim 31, wherein said switching means comprises bipolar transistors.

33. The circuitry as claimed in claim 32, wherein said exciting pulse generating means generates the gate signal when said switching means should be turned off.

34. The circuitry as claimed in claim 33, wherein said exciting pulse generating means generates the gate signal when said switching means should be turned on.

35. The circuitry as claimed in claim 34, wherein said exciting pulse generating means generates the gate signal when said switching means should be turned off and when said switching means should be turned on.

36. The circuitry as claimed in claim 35, wherein the plurality of voltage levels to be selected by said voltage selecting means and the pulse signals to be output from said pulse generating means correspond one-to-one to each other.

37. The circuitry as claimed in claim 36, wherein the plurality of voltage levels to be selected by said voltage selecting means and the pulse signals to be output from said pulse generating means have a 1:n correspondence to each other.

38. The circuitry as claimed in claim 1, wherein the capacitor is replaceable.

39. The circuitry as claimed in claim 38, wherein the preselected number of pulses to be counted by said pulse generating means is variable.

40. The circuitry as claimed in claim 39, wherein the capacitor is replaced or the preselected number of pulses is varied when the motor is replaced.

41. The circuitry as claimed in claim 40, wherein said switching means comprises a plurality of MOSFETs.

42. The circuitry as claimed in claim 41, wherein said switching means comprises bipolar transistors.

43. The circuitry as claimed in claim 42, wherein said exciting pulse generating means generates the gate signal when said switching means should be turned off.

44. The circuitry as claimed in claim 43, wherein said exciting pulse generating means generates the gate signal when said switching means should be turned on.

45. The circuitry as claimed in claim 44, wherein said exciting pulse generating means generates the gate signal when said switching means should be turned off and when said switching means should be turned on.

46. The circuitry as claimed in claim 45, wherein the plurality of voltage levels to be selected by said voltage selecting means and the pulse signals to be output from said pulse generating means correspond one-to-one to each other.

47. The circuitry as claimed in claim 46, wherein the plurality of voltage levels to be selected by said voltage selecting means and the pulse signals to be output from said pulse generating means have a 1:n correspondence to each other.

48. The circuitry as claimed in claim 1, wherein the preselected number of pulses to be counted by said pulse generating means is variable.

49. The circuitry as claimed in claim 48, wherein the capacitor is replaced or the preselected number of pulses is varied when the motor is replaced.

50. The circuitry as claimed in claim 49, wherein said switching means comprises a plurality of MOSFETs.

51. The circuitry as claimed in claim 50, wherein said switching means comprises bipolar transistors.

52. The circuitry as claimed in claim 51, wherein said exciting pulse generating means generates the gate signal when said switching means should be turned off.

53. The circuitry as claimed in claim 52, wherein said exciting pulse generating means generates the gate signal when said switching means should be turned on.

54. The circuitry as claimed in claim 53, wherein said exciting pulse generating means generates the gate signal when said switching means should be turned off and when said switching means should be turned on.

55. The circuitry as claimed in claim 54, wherein the plurality of voltage levels to be selected by said voltage selecting means and the pulse signals to be output from said pulse generating means correspond one-to-one to each other.

56. The circuitry as claimed in claim 55, wherein the plurality of voltage levels to be selected by said voltage selecting means and the pulse signals to be output from said pulse generating means have a 1:n correspondence to each other.

57. The circuitry as claimed in claim 1, wherein said switching means comprises a plurality of MOSFETs.

58. The circuitry as claimed in claim 1, wherein said switching means comprises bipolar transistors.

59. The circuitry as claimed in claim 58, wherein said exciting pulse generating means generates the gate signal when said switching means should be turned off.

60. The circuitry as claimed in claim 59, wherein said exciting pulse generating means generates the gate signal when said switching means should be turned on.

61. The circuitry as claimed in claim 60, wherein said exciting pulse generating means generates the gate signal when said switching means is turned off and when said switching means is turned on.

62. The circuitry as claimed in claim 61, wherein the plurality of voltage levels to be selected by said voltage selecting means and the pulse signals to be output from said pulse generating means correspond one-to-one to each other.

63. The circuitry as claimed in claim 62, wherein the plurality of voltage levels to be selected by said voltage selecting means and the pulse signals to be output from said pulse generating means have a 1:n correspondence to each other.

64. The circuitry as claimed in claim 1, wherein said exciting pulse generating means generates the gate signal when said switching means should be turned off.

65. The circuitry as claimed in claim 1, wherein said exciting pulse generating means generates the gate signal when said switching means should be turned on.

66. The circuitry as claimed in claim 1, wherein said exciting pulse generating means generates the gate signal when said switching means should be turned off and when said switching means should be turned on.

67. The circuitry as claimed in claim 66, wherein the plurality of voltage levels to be selected by said voltage selecting means and the pulse signals to be output from said pulse generating means correspond one-to-one to each other.

68. The circuitry as claimed in claim 66, wherein the plurality of voltage levels to be selected by said voltage selecting means and the pulse signals to be output from said pulse generating means have a 1:n correspondence to each other.

69. The circuitry as claimed in claim 1, wherein the plurality of voltage levels to be selected by said voltage selecting means and the pulse signals to be output from said pulse generating means correspond one-to-one to each other.

70. The circuitry as claimed in claim 1, wherein the plurality of voltage levels to be selected by said voltage selecting means and the pulse signals to be output from said pulse generating means have a 1:n correspondence to each other.

71. A method of controlling rotation of a motor by executing PWM control over switching devices associated with drive coils each of which is assigned to a particular phase of said motor, said method comprising the steps of:
   (a) causing a frequency oscillator to generate a triangular wave and comparing said triangular wave and a voltage for PWM oscillation frequency modulation to thereby output a pulse sequence:
   (b) counting a preselected number of pulses included in the pulse sequence by using each of negative-going edges and positive-going edges of position signals output from position sensing means, which is responsive to angular positions of the motor, as a trigger to thereby output pulse signals:
   (c) converting a voltage for duty modulation to a plurality of voltage levels:
   (d) selecting one of the plurality of voltage levels in accordance with the pulse signals, and outputting a voltage level selected as a duty modulation voltage;
   (e) outputting a first duty signal by comparing the voltage for duty modulation and the triangular wave:
   (f) outputting a second duty signal by comparing the duty modulation voltage and the triangular wave: and
   (g) generating a gate signal in accordance with the position signals output from said position sensing means and the first and second duty signals.

72. The method as claimed in claim 71, wherein step (c) uses a plurality of resistors for voltage division.

73. The method as claimed in claim 72, wherein said frequency oscillating means generates the triangular wave on the basis of charging and discharging of a capacitor.

74. The method as claimed in claim 73, wherein the capacitor has a variable capacitance.

75. The method as claimed in claim 74, wherein the capacitor is replaceable.

76. The method as claimed in claim 75, wherein the preselected number of pulses to be counted is variable.

77. The method in accordance with claim 74, wherein the capacitor is replaced or the preselected number of pulses is varied when the motor is replaced.

78. The method as claimed in claim 77, wherein the second duty signal is fed to the switching devices when said switching devices should be turned off.

79. The method as claimed in claim 77, wherein the second duty is applied to the switching devices when said switching devices should be turned on.

80. The method as claimed in claim 79, wherein in step (d) the plurality of voltage levels and the pulse signals correspond one-to-one to each other.

81. The method as claimed in claim 79, wherein the plurality of voltage levels and the pulse signals have a 1:n correspondence to each other.

82. The method as claimed in claim 77, where in the second duty signal is fed to the switching devices when said switching devices should be turned off and when said switching devices should be turned on.

83. The method as claimed in claim 71, wherein said frequency oscillating means generates the triangular wave on the basis of charging and discharging of a capacitor.

84. The method as claimed in claim 83, wherein the capacitor has a variable capacitance.

85. The method as claimed in claim 84, wherein the capacitor is replaceable.

86. The method as claimed in claim 85, wherein the preselected number of pulses to be counted is variable.

87. The method in accordance with claim 85, wherein the capacitor is replaced or the preselected number of pulses is varied when the motor is replaced.

88. The method as claimed in claim 87, wherein the second duty signal is fed to the switching devices when said switching devices should be turned off.

89. The method as claimed in claim 87, wherein the second duty is applied to the switching devices when said switching devices should be turned on.

90. The method as claimed in claim 89, wherein in step (d) the plurality of voltage levels and the pulse signals correspond one-to-one to each other.

91. The method as claimed in claim 89, wherein the plurality of voltage levels and the pulse signals have a 1:n correspondence to each other.

92. The method as claimed in claim 87, wherein the second duty signal is fed to the switching devices when said switching devices should be turned off and when said switching devices should be turned on.

93. The method as claimed in claim 71, wherein the capacitor has a variable capacitance.

94. The method as claimed in claim 93, wherein the capacitor is replaceable.

95. The method as claimed in claim 94, wherein the preselected number of pulses to be counted is variable.

96. The method in accordance with claim 94, wherein the capacitor is replaced or the preselected number of pulses is varied when the motor is replaced.

97. The method as claimed in claim 96, wherein the second duty signal is fed to the switching devices when said switching devices should be turned off.

98. The method as claimed in claim 96, wherein the second duty is applied to the switching devices when said switching devices should be turned on.

99. The method as claimed in claim 98, wherein in step (d) the plurality of voltage levels and the pulse signals correspond one-to-one to each other.

100. The method as claimed in claim 98, wherein the plurality of voltage levels and the pulse signals have a 1:n correspondence to each other.

101. The method as claimed in claim 96, wherein the second duty signal is fed to the switching devices when said switching devices should be turned off and when said switching devices are turned on.

102. The method as claimed in claim 71, wherein the capacitor is replaceable.

103. The method as claimed in claim 102, wherein the preselected number of pulses to be counted is variable.

104. The method in accordance with claim 102, wherein the capacitor is replaced or the preselected number of pulses is varied when the motor is replaced.

105. The method as claimed in claim 104, wherein the second duty signal is fed to the switching devices when said switching devices should be turned off.

106. The method as claimed in claim 104, wherein the second duty is applied to the switching devices when said switching devices should be turned on.

107. The method as claimed in claim 106, wherein in step (d) the plurality of voltage levels and the pulse signals correspond one-to-one to each other.

108. The method as claimed in claim 106, wherein the plurality of voltage levels and the pulse signals have a 1:n correspondence to each other.

109. The method as claimed in claim 104, wherein the second duty signal is fed to the switching devices when said switching devices should be turned off and when said switching devices should be turned on.

110. The method as claimed in claim 71, wherein the preselected number of pulses to be counted is variable.

111. The method as claimed in claim 71, wherein the second duty signal is fed to the switching devices when said switching devices should be turned off.

112. The method as claimed in claim 71, wherein the second duty is applied to the switching devices when said switching devices should be turned on.

113. The method as claimed in claim 112, wherein in step (d) the plurality of voltage levels and the pulse signals correspond one-to-one to each other.

114. The method as claimed in claim 112, wherein the plurality of voltage levels and the pulse signals have a 1:n correspondence to each other.

115. The method as claimed in claim 71, wherein the second duty signal is fed to the switching devices when said switching devices should be turned off and when said switching devices should be turned on.

116. The method as claimed in claim 71, wherein the plurality of voltage levels and the pulse signals have a 1:n correspondence to each other.

* * * * *